United States Patent
Schleder et al.

(10) Patent No.: US 12,024,058 B2
(45) Date of Patent: Jul. 2, 2024

(54) METHOD FOR OPERATING A BATTERY OF A PARKED MOTOR VEHICLE, AND MOTOR VEHICLE

(71) Applicant: VOLKSWAGEN AKTIENGESELLSCHAFT, Wolfsburg (DE)

(72) Inventors: Max Schleder, Braunschweig (DE); Björn Rumberg, Hannover (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 247 days.

(21) Appl. No.: 17/629,097

(22) PCT Filed: Jul. 16, 2020

(86) PCT No.: PCT/EP2020/070160
§ 371 (c)(1),
(2) Date: Jan. 21, 2022

(87) PCT Pub. No.: WO2021/013695
PCT Pub. Date: Jan. 28, 2021

(65) Prior Publication Data
US 2022/0289070 A1 Sep. 15, 2022

(30) Foreign Application Priority Data
Jul. 22, 2019 (DE) .................. 10 2019 119 761.9

(51) Int. Cl.
*B60L 58/15* (2019.01)
*B60L 1/16* (2006.01)
(Continued)

(52) U.S. Cl.
CPC .............. *B60L 58/15* (2019.02); *B60L 1/16* (2013.01); *B60L 58/26* (2019.02);
(Continued)

(58) Field of Classification Search
CPC .......... B60L 58/15; B60L 58/26; B60L 1/16; H01M 10/44; H01M 10/48; H01M 10/42
See application file for complete search history.

(56) References Cited

U.S. PATENT DOCUMENTS

| | | | |
|---|---|---|---|
| 8,314,592 B2 | 11/2012 | Rudorff et al. | |
| 8,446,128 B2 * | 5/2013 | Lickfelt | B60L 1/00 320/136 |

(Continued)

FOREIGN PATENT DOCUMENTS

| | | |
|---|---|---|
| DE | 10 2005 034 588 A1 | 2/2007 |
| DE | 10 2009 036 943 A1 | 3/2011 |

(Continued)

OTHER PUBLICATIONS

Search Report for German Patent Application DE 10 2019 119 761.9, mailed Jun. 19, 2020.

(Continued)

*Primary Examiner* — Tan Q Nguyen
(74) *Attorney, Agent, or Firm* — PEARL COHEN ZEDEK LATZER BARATZ LLP

(57) ABSTRACT

A method for operating a battery of a parked motor vehicle includes determining an operating state of the motor vehicle, determining a current charging state of the battery when the operating state of the motor vehicle is a parked state, determining a first upper charging state limit value of the battery, first active lowering of the charging state of the battery when the current charge state is greater than the first upper charging state limit value, determining a second upper charging state limit value of the battery, and ending the first active lowering of the charging state when the charge state of the battery falls below the second upper charging state limit value. The invention also relates to a motor vehicle.

10 Claims, 3 Drawing Sheets

(51) Int. Cl.
  *B60L 58/26* (2019.01)
  *H01M 10/42* (2006.01)
  *H01M 10/44* (2006.01)
  *H01M 10/48* (2006.01)
  *H01M 10/613* (2014.01)
  *H01M 10/625* (2014.01)
  *H01M 10/6561* (2014.01)

(52) U.S. Cl.
  CPC ....... *H01M 10/425* (2013.01); *H01M 10/443* (2013.01); *H01M 10/486* (2013.01); *H01M 10/613* (2015.04); *H01M 10/625* (2015.04); *H01M 10/6561* (2015.04); *B60L 2240/545* (2013.01); *H01M 2010/4271* (2013.01); *H01M 2220/20* (2013.01)

(56) References Cited

U.S. PATENT DOCUMENTS

| | | | |
|---|---|---|---|
| 9,296,302 B2 | 3/2016 | Birke et al. | |
| 2014/0247018 A1* | 9/2014 | Kikuchi | H02J 7/00716 320/150 |
| 2016/0193940 A1* | 7/2016 | Tashiro | B60L 53/00 903/907 |
| 2016/0221456 A1* | 8/2016 | Rhodes | B60L 15/2045 |
| 2017/0101027 A1* | 4/2017 | Zhou | B60L 58/13 |
| 2017/0120774 A1* | 5/2017 | Obata | B60L 58/26 |
| 2020/0384891 A1 | 12/2020 | Hackner | |

FOREIGN PATENT DOCUMENTS

| | | |
|---|---|---|
| DE | 10 2011 053 853 A1 | 3/2013 |
| DE | 10 2014 200678 A1 | 7/2015 |
| DE | 10 2016 101100 A1 | 8/2016 |
| DE | 10 2017 221825 A1 | 6/2019 |

OTHER PUBLICATIONS

International Search Report for International Patent Application No. PCT/EP2020/070160, mailed Sep. 28, 2020.

* cited by examiner

METHOD FOR OPERATING A BATTERY OF A PARKED MOTOR VEHICLE, AND MOTOR VEHICLE

CROSS-REFERENCE TO RELATED APPLICATIONS

This application is a National Phase Application of PCT International Application No. PCT/EP2020/070160, International Filing Date Jul. 16, 2020, claiming the benefit of German Patent Application No. 10 2019 119 761.9, filed Jul. 22, 2019, which is/are hereby incorporated by reference.

FIELD OF THE INVENTION

The present invention relates to a method for operating a battery of a parked motor vehicle. The invention also relates to a motor vehicle which is designed to carry out such a method.

BACKGROUND OF THE INVENTION

In motor vehicles with an electric motor for driving the motor vehicle, such as an electric vehicle or a full hybrid vehicle, the electric power that is required to operate the electric motor is usually provided by a battery. Modern batteries with a relatively high power density are based on lithium-ion technology and are therefore also referred to as Li-ion batteries.

One drawback of Li-ion batteries is a loss of capacity with increasing service life. Such a loss of capacity is also referred to as the "aging" of the battery. In Li-ion batteries, the aging process can be influenced by various factors, particularly by the charge state of the battery, also referred to as the "SOC" (state of charge), and the battery temperature. The higher the charge state of the battery, the faster side reactions that accelerate aging take place in the battery. The speed of the side reactions is disproportionate to the charge state. This means that an additional increase in the charge state results in a progressive increase in the speed of the side reactions. Above a charge state of about 80%, the increase in the rate of the side reactions is already exponential relative to the increase in the charge state. The rate of these side reactions also increases with increasing temperatures. Therefore, leaving a motor vehicle with a fully charged battery parked for a long time in relatively high outside temperatures is particularly disadvantageous for the aging of the battery.

DE 10 2014 219 658 A1 discloses a method for optimized charging of a battery in a motor vehicle as a function of a route that is likely to be traveled. The aim of this method is to charge the battery only so far that the planned route can be covered. This is intended to reduce the aging of the battery as well as energy consumption. This has the drawback that the method can only be carried out if route data for planned routes are available.

Another method for determining the aging of a battery is known from DE 10 2008 034 461 A1. Here, a battery is initially charged from a first charge state to a second charge state, then actively discharged to a third charge state, and finally an open-circuit voltage of the battery is determined. This enables inferences to be made about the state of wear of the battery. The drawback here is that only an analysis is carried out, and there is no active prevention of the aging of the battery.

SUMMARY OF THE INVENTION

It is therefore the object of the present invention to eliminate or at least partially eliminate the above-described drawbacks in a method for operating a battery of a parked motor vehicle, and in a motor vehicle. In particular, it is the object of the present invention to provide a method for operating a battery of a parked motor vehicle and a motor vehicle which ensure an efficient reduction in the aging of the battery in a simple and cost-effective manner.

The above object is achieved by the claims. Accordingly, the object is achieved by a method for operating a battery of a parked motor vehicle and by a motor vehicle. Additional features and details of the invention follow from the subclaims, the description, and the drawings. As will readily be understood, features and details that are described in connection with the method according to the invention are also applicable in connection with the motor vehicle according to the invention and vice versa, so that reciprocal reference is and can always be made with respect to the disclosure concerning the individual aspects of the invention.

According to a first aspect of the invention, the object is achieved by a method for operating a battery of a parked motor vehicle. The method comprises the following steps:

Determining an operating state of the motor vehicle using a control apparatus of the motor vehicle, determining a current charge state of the battery by means of the control apparatus when the operating state of the motor vehicle is a parked state, determining a first upper charge state limit value of the battery using the control apparatus of the motor vehicle, first active lowering of the charge state of the battery by means of the control apparatus when the current charge state is greater than the first upper charge state limit value, determining a second upper charge state limit value of the battery by means of the control apparatus, the second upper charge state limit value being less than the first upper charge state limit value, and ending the first active lowering of the charge state by means of the control apparatus when the charge state of the battery falls below the second upper charge state limit value.

The operating state of the motor vehicle is preferably identified by means of a determination device of the control apparatus. Various parameters, such as vehicle speed, an on-state of the motor vehicle, an activation of a parking brake, a parking position of a switching device, a locked state of a locking system of the motor vehicle, or the like can be taken into account here.

When the operating state of the motor vehicle is the parked state, the charge state of the battery is determined by means of the control apparatus. Within the scope of the invention, a parked state of the motor vehicle is understood to mean a state in which the motor vehicle is parked and preferably inactive. The parked state is preferably defined so as to mean that the motor vehicle is at least switched off. In the switched-off state, pressing an accelerator pedal has no effect on the electric motor. The parked state is preferably further defined as meaning that the parking brake is activated. More preferably, the parked state is defined as meaning that the motor vehicle is locked. The parked state is also preferably defined so as to mean that the switching device of the motor vehicle is set in the park position.

The current charge state of the battery can be approximately determined, for example, by reading out a stored charge state history of the battery. For example, charging and discharging processes of the battery are documented in the charge state history. The current charge state can be reliably determined on the basis of the known capacity of the battery and the known energy flows of the charging and discharging processes. This can be reliably carried out particularly if the battery has a known charge state in the charge state history, particularly a charge state of approximately 100%. Alternatively or in addition, the current charge state of the battery is determined by measuring an open-circuit voltage of the battery. A characteristic map and/or a simulation model of the battery is preferably used for this purpose. In addition, a battery temperature is preferably taken into account in order to improve the accuracy of the determination of the current charge state. Alternatively or in addition, the current charge state is determined during operation of the motor vehicle and stored in a memory device, so that when the current charge state is determined, the current charge state is read from the memory device.

The first upper charge state limit value of the battery is defined by means of the control apparatus. The first upper charge state limit value describes a charge state above which excessive aging of the battery is to be expected. This is preferably done in consideration of laboratory data on the aging of the battery and/or a battery model and/or a characteristic map of the battery, or the like. The first upper charge state limit value can be predefined, for example. Preferably, the first upper charge state limit value is about 80% of the maximum total charge of the battery. Exceeding the first upper charge state limit value for an extended period of time means excessive aging for the battery.

When the current charge state exceeds the first upper charge state limit value, the first active lowering of the charge state of the battery is performed by means of the control apparatus. To achieve this, electric power from the battery is fed to a consumer, for example. The first active lowering is preferably performed so as to limit a maximum battery current such that overloading or excessive loading of the battery is avoided, since this would otherwise promote aging of the battery.

The second upper charge state limit value of the battery is defined by means of the control apparatus. The second upper charge state limit value describes a charge state in which only relatively little aging of the battery is to be expected. Therefore, the second upper charge state limit value is less than or equal to the first upper charge state limit value. This is preferably done in consideration of laboratory data on the aging of the battery and/or a battery model and/or a characteristic map of the battery, or the like. The second upper charge state is preferably selected in such a way that at least 60% of a maximum range of the motor vehicle is provided in order to ensure proper use of the motor vehicle after the motor vehicle has been parked.

The first active lowering of the charge state is ended by the control apparatus when the charge state of the battery falls below the second upper charge state limit value. In other words, the first active lowering of the charge state is performed in a targeted manner until the battery has reached a specified charge state. Falling below the second upper charge state limit value means that the battery now has a charge state at which only slight aging of the battery is to be expected. The motor vehicle can thus also be parked for an extended period of time without having to worry about excessive aging of the battery.

A method according to the invention for operating a battery of a parked motor vehicle has the advantage over conventional methods that excessive aging of the battery is avoided by simple means and in a cost-effective manner. This is achieved in particular by virtue of the fact that charge states of the battery that are especially conducive to aging are reduced and thus avoided. In addition, the targeted partial discharging of the battery ensures that sufficient electric power is available to operate the electric motor when the motor vehicle is used again.

According to a preferred further development of the invention, a provision can be made in a method that the first active lowering of the charge state of the battery is performed by means of an air conditioning device in the motor vehicle. A provision can be made according to the invention that the first active lowering of the charge state can also be performed by other means. For example, an air conditioning system of the motor vehicle, particularly a cooling function for cooling a passenger compartment of the motor vehicle, can be used as the air conditioning device. An ambient temperature and/or interior temperature of the motor vehicle is preferably determined. When the outside or inside temperatures are low, the first active lowering can be performed by heating the passenger compartment using the air conditioning device. When the outside or inside temperatures are high, the first active lowering can be performed by cooling the passenger compartment using the air conditioning device. The use of an air conditioning device for the first active lowering has the advantage that targeted partial discharging of the battery is ensured by simple means and in a cost-effective manner. What is more, discharge currents, which can effect an especially rapid partial discharging of the battery, can be realized in this way. The discharge currents are preferably limited in order to avoid overloading the battery.

It is preferred according to the invention that the battery be cooled by means of the air conditioning device during the first active lowering of the charge state. Accordingly, the active lowering of the charge state is preferably performed at least partially by means of a battery cooling system of the motor vehicle. The battery cooling system can be implemented, for example, by thermally coupling a passive battery cooling device to the air conditioning system of the motor vehicle. In this case, cold for cooling the battery is transferred to the passive battery cooling device by operating the air conditioning system. Alternatively or in addition, an independent battery cooling system can be used which itself generates the cold for cooling the battery. Cooling the battery has the advantage that the side reactions in the battery are further reduced by simple means and in a cost-effective manner. Thus, the aging of the battery is reduced at the same time through the partial discharging and the cooling of the battery.

More preferably, the first active lowering of the charge state is performed by feeding energy into a supply network and/or operating a lighting device in the motor vehicle and/or operating an entertainment system in the motor vehicle. In order to feed the energy into the supply network, the motor vehicle is preferably connected to a charging device. The feed-in can also be referred to as a "return feed-in" if this electric power was at least partially drawn from the supply network. The electric power delivered in this manner can be advantageously made available to other consumers via the supply network. For example, a low beam, high beam, interior lighting, or the like can be used as the lighting device. For example, an LCD display device and/or a sound system can be used as an entertainment system. Using the lighting device and the entertainment system has the advantage that they can be used advantageously as an indicator that the first active lowering is taking place. In addition, the targeted feeding into the supply network and the use of the lighting device and the entertainment system makes battery currents especially easy to control, so that an overloading of the battery can easily be avoided.

In an especially preferred embodiment of the invention, a provision can be made in a method that a battery temperature of the battery is determined by means of the control apparatus, the battery being actively cooled during the first active lowering at least when the battery temperature exceeds an upper temperature threshold value, and/or the battery being actively cooled only until the battery temperature falls below a lower temperature threshold. Preferably, the lower temperature threshold is less than or equal to the upper temperature threshold. To determine the battery temperature, the motor vehicle preferably has at least one temperature sensor which is arranged in or on the battery. The battery is therefore cooled at least until the battery temperature reaches the lower temperature threshold value. The motor vehicle preferably has a plurality of generic temperature sensors which are arranged at different points on the battery, particularly on different battery cells. The determination of a plurality of battery temperatures has the advantage that battery cells having an especially high battery temperature can be discharged in a targeted manner, whereas battery cells having a lower battery temperature are not discharged or are discharged to a lesser extent. The cooling is preferably carried out in such a way that the battery cells having a relatively high battery temperature are cooled more than battery cells having a relatively low battery temperature. Such cooling has the advantage that the first active lowering can be carried out by simple means and in a cost-effective manner such that critical battery temperatures are avoided and excess electric power can be better utilized, for example by feeding it back into the supply network.

The operating state is preferably identified by an input via a user interface of the motor vehicle. Here, the user can indicate, for example, that the motor vehicle is being placed into a parked state or is in a parked state. An exact or approximate parking duration is preferably identified here so that the expediency of carrying out the method according to the invention can be checked automatically. The implementation of the method according to the invention is especially expedient, for example, in the case of a parking duration of 24 hours or more. An input device installed in the motor vehicle, particularly an on-board computer, entertainment system, or the like, and/or a remote control is preferably used as the user interface. When parking the motor vehicle, the user can input, for example, that the motor vehicle will be parked for at least a week. The charge state will thus be preferably lowered to an especially low value such as 60%, for example, in order to optimally protect the battery. The battery is preferably also connected to a charging device, so that the battery can be charged immediately before the end of the predetermined parking period—e.g., to 80% of the maximum possible total charge—in order to increase the range of the motor vehicle. It is therefore also preferred that a future usage category such as city driving or a longer trip on the freeway be inputted via the user interface in order to make the charging strategy dependent thereon. If continued travel in city traffic is likely, then supplemental charging is not necessary, but if more extended travel is planned, then supplemental charging, particularly to a charge level of over 80%, may be advantageous in order to avoid frequent recharging during the trip. An input via the user interface has the advantage that the aging of the battery is reduced in an especially situation-dependent manner by simple means and in a cost-effective manner.

According to a preferred embodiment of the invention, the first upper charge state limit value and/or the second upper charge state limit value is defined as a function of the battery temperature of the battery. It is preferred that this be done using a characteristic map. The determination is preferably carried out in such a way that the first upper charge state limit value and/or the second upper charge state limit value decreases as the battery temperature rises. This takes into account the fact that the chemical side reactions in the battery take place more quickly as the battery temperature and charge state increase. The battery is thus protected in an especially advantageous manner by simple means and at low cost.

The second upper charge state limit value is especially preferably defined such that the second upper charge state limit value is between 75% and 85% of a maximum possible total charge of the battery. The second upper charge state limit value is especially preferably defined such that the second upper charge state limit value is approximately 80% of the maximum possible total charge of the battery. In the case of batteries based on lithium ions, the chemical side reactions take place especially quickly beginning at a charge state of 80%, so that leaving the motor vehicle parked for an extended period of time, for example longer than 24 hours, with a charge state of above 80% would lead to excessive aging of the battery. In order to significantly reduce this aging, a charge state of less than or equal to 80% of the maximum possible total charge is advantageous.

It is preferred that a parking duration be identified during the determination of the operating state of the motor vehicle, with the first active lowering being performed after a first minimum parking duration has been exceeded, and with a second active lowering of the charge state of the battery to a third upper charge state limit value being performed when the identified parking duration exceeds the second minimum parking duration, the third upper charge state limit value being lower than the second upper charge state limit value. In other words, the first active lowering of the charge state is performed only when the motor vehicle has been parked for a specific period of time. This can be done after a few hours—e.g., 8 or 12 hours. Preferably, the first active lowering occurs after about 24 hours. If the motor vehicle remains in the parked state significantly longer than this period of time, the second active lowering is performed. This takes place, for example, after 3 to 10 days, preferably after about 7 days. The third upper charge state value is preferably between 50% and 70% of the maximum possible total charge of the battery. The third upper charge state value is preferably approximately 60% of the maximum possible total charge of the battery. According to the invention, the second active lowering can be performed by the same means that have already been described for the first active lowering, it being possible for the first active lowering and the second active lowering to be performed by different means. The first active lowering preferably is performed by cooling the battery. The second active lowering is especially preferably carried out by means of a feed into the supply network. This ensures for one that, after the first minimum parking period, the battery is set to a charge state in which excessive aging of the battery is avoided and, for another, that sufficient electric power is made available for the intended use of the motor vehicle. If an extended shutdown is identified, the battery is placed in an even more favorable charge state in which aging occurs even more slowly. In this case, it is accepted that a reduced range will be available to the driver when the motor vehicle is started up again.

According to a second aspect of the invention, the object is achieved by a motor vehicle. The motor vehicle has an electric motor for driving the motor vehicle and a battery for storing and providing electric power for operating the electric motor. In addition, the motor vehicle has a control apparatus for controlling at least one electrical consumer of the motor vehicle that is electrically coupled to the battery. According to the invention, the motor vehicle is designed to carry out the inventive method.

All of the advantages that have already been described for a method according to the first aspect of the invention also apply to the motor vehicle according to the invention. Accordingly, the motor vehicle according to the invention has the advantage over conventional motor vehicles that excessive aging of the battery can be avoided by simple means and in a cost-effective manner. This is achieved particularly by virtue of the fact that charge states of the battery that are especially conducive to the aging of the battery can be easily reduced, and thus avoided. In addition, the possibility of the targeted partial discharging of the battery ensures that sufficient electric power is made available to operate the electric motor when the motor vehicle is used again.

BRIEF DESCRIPTION OF THE DRAWINGS

A method according to the invention for operating a battery of a parked motor vehicle as well as a motor vehicle according to the invention will be explained in greater detail below with reference to drawings. Brief description of the schematic drawings.

Elements with the same function and mode of operation are each provided with the same reference symbols in FIGS. 1 to 3.

DETAILED DESCRIPTION OF THE INVENTION

Figure 1:
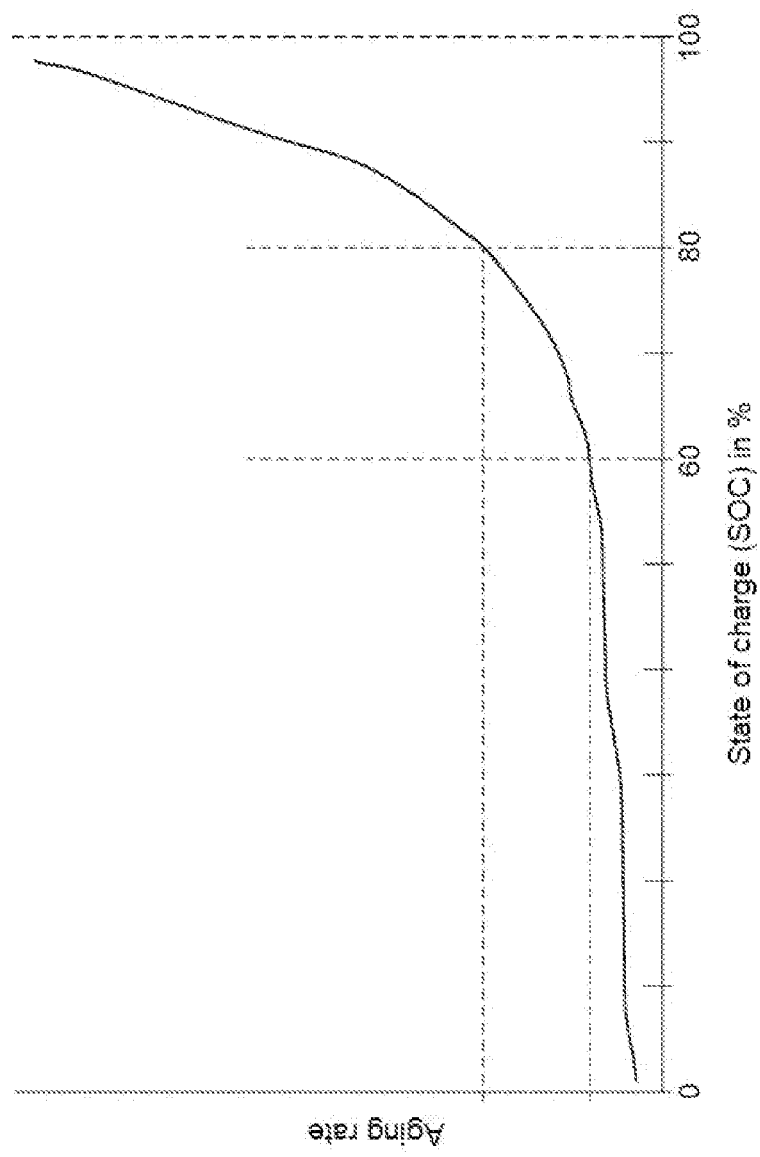
FIG. 1 is a diagram showing the relationship between the aging rate of a battery and the charge state of the battery.

In FIG. 1, the relationship between the aging rate of a battery 1 (see FIG. 2) and a charge state of the battery 1 is shown schematically in a diagram. As can be seen from the diagram, the aging rate of the battery 1 increases only slightly in charge states from 0% to 60%. In other words, a higher charge state of the battery 1 in this range results only in a slight increase in the side reactions and thus in the aging of the battery 1. In the range between about 60% and 80%, a progressive increase in the aging rate as a function of the charge state can already be observed. With a charge state above 80% of the maximum total charge of the battery 1, the relationship of the charge state to the aging rate is almost exponential, so that a particularly high aging rate of the battery 1 is to be expected with a charge state in this range. For this reason, it is the aim of the method according to the invention to avoid these charge states of the battery 1.

Figure 2:
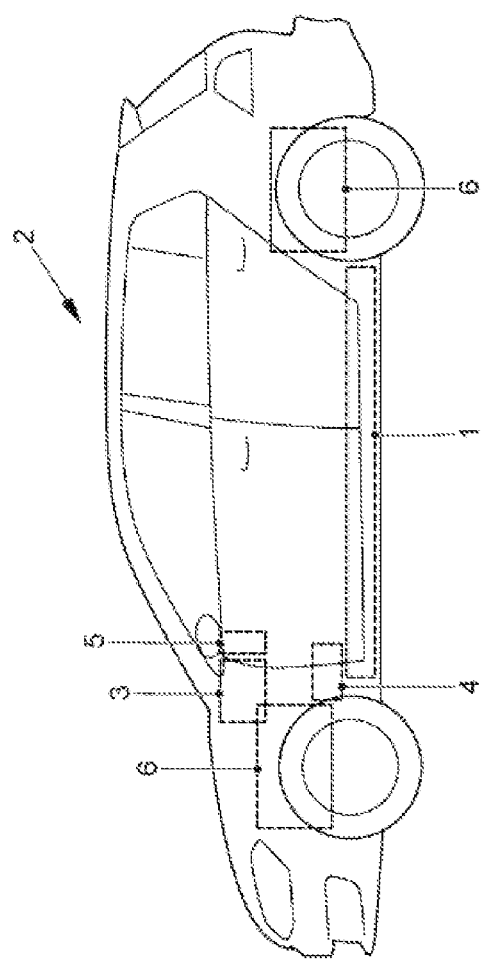
FIG. 2 shows a side view of a preferred embodiment of a motor vehicle according to the invention.

FIG. 2 shows a schematic side view of a preferred embodiment of a motor vehicle 2 according to the invention. The motor vehicle 2 has a battery 1 which, in this exemplary embodiment, is arranged in the vicinity of a vehicle floor of the motor vehicle 2. In this embodiment, the motor vehicle 2 has a plurality of electric motors 6 for driving the motor vehicle 2 that are arranged on different axles of the motor vehicle 2. The motor vehicle 2 can have one electric motor 6 on each wheel, for example. Alternatively, the motor vehicle 2 can have a electric motor 6 on a front axle and a rear axle, respectively. Alternatively, the motor vehicle 2 can also have only one electric motor 6. The motor vehicle 2 has an air conditioning device 4 for regulating an on-board climate and/or for cooling the battery 1. The air conditioning device 4 is preferably designed both for cooling and heating a passenger compartment of the motor vehicle 2 and for cooling the battery 1. The motor vehicle 2 has a control apparatus 3 for controlling electrical components of motor vehicle 2, such as the air conditioning device 4, the electric motor 6, or the like. The motor vehicle 2 also has a user interface 5 for manual user inputs by a user of the motor vehicle 2.

Figure 3:
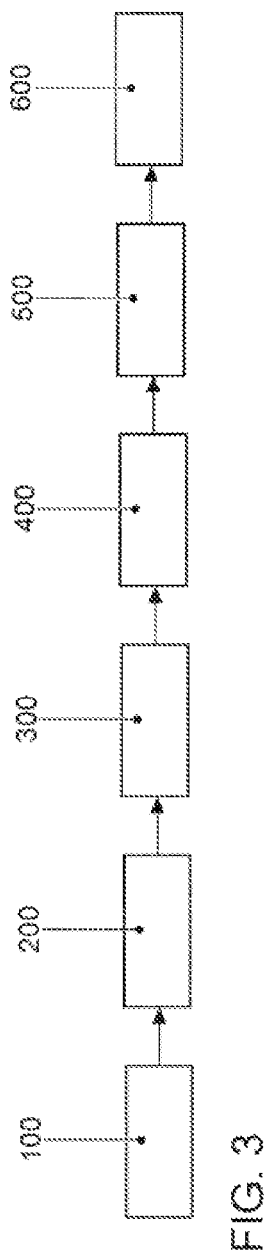
FIG. 3 shows a flowchart of a preferred embodiment of a method according to the invention.

In FIG. 3, a preferred embodiment of a method according to the invention is shown schematically in a flowchart. In a first step 100 of the method, the operating state of the motor vehicle 2 is determined by means of the control apparatus 3 of the motor vehicle 2. In a second method step 200, the current charge state of the battery 1 is determined by means of the control apparatus 3 when the operating state of the motor vehicle 2 is a parked state. In a third method step 300, the first upper charge state limit value of the battery 1 is defined by means of the control apparatus 3 of the motor vehicle 2. In a fourth method step 400, the control apparatus 3 of the motor vehicle 2 carries out the first active lowering of the charge state of the battery 1 when the current charge state is greater than the first upper charge state limit value. In a fifth method step 500, the second upper charge state limit value of the battery 1 is defined by means of the control apparatus 3. The second upper charge state limit value is less than or equal to the first upper charge state limit value. In a sixth method step 600, the first active lowering of the charge state of the battery 1 is ended by means of the control apparatus 3 when the charge state of the battery 1 falls below the second upper charge state limit value.

LIST OF REFERENCE SYMBOLS 1 battery
2 motor vehicle
3 control apparatus
4 air conditioning device
5 user interface
6 electric motor
100 first method step
200 second method step
300 third method step
400 fourth method step
500 fifth method step
600 sixth method step

The invention claimed is:

1. A method for operating a battery of a parked motor vehicle, comprising the following steps:
   determining an operating state of the motor vehicle using a control apparatus of the motor vehicle,
   determining a current charge state of the battery by means of the control apparatus when the operating state of the motor vehicle is a parked state,
   determining a first upper charge state limit value of the battery by means of the control apparatus of the motor vehicle,
   first active lowering of the charge state of the battery by means of the control apparatus of the motor vehicle when the current charge state is greater than the first upper charge state limit value, determining a second upper charge state limit value of the battery by means of the control apparatus, the second upper charge state limit value being less than or equal to the first upper charge state limit value, and ending the first active lowering of the charge state by means of the control apparatus when the charge state of the battery falls below the second upper charge state limit value.

2. The method as set forth in claim 1, wherein the first active lowering of the charge state of the battery is performed by an air conditioning device of the motor vehicle.

3. The method as set forth in claim 2, wherein the battery is cooled by the air conditioning device during the first active lowering of the charge state.

4. The method as set forth in claim 1, wherein the first active lowering of the charge state is performed by feeding energy into a supply network and/or operating a lighting device of the motor vehicle and/or operating an entertainment system of the motor vehicle.

5. The method as set forth in claim 1, wherein a battery temperature of the battery is determined by means of the control apparatus, the battery being actively cooled during the first active lowering at least when the battery temperature exceeds an upper temperature threshold value, and/or the battery is actively cooled only until the battery temperature falls below a lower temperature threshold.

6. The method as set forth in claim 1, wherein the operating state is identified by an input via a user interface of the motor vehicle.

7. The method as set forth in claim 1, wherein the first upper charge state limit value and/or the second upper charge state limit value is defined as a function of the battery temperature of the battery.

8. The method as set forth in claim 1, wherein the second upper charge state limit value is defined such that the second upper charge state limit value is between 75% and 85% of a maximum possible total charge of the battery.

9. The method as set forth in claim 1, wherein a parking duration is identified during the determination of the operating state of the motor vehicle, with the first active lowering being performed after a first minimum parking duration has been exceeded, and with a second active lowering of the charge state of the battery to a third upper charge state limit value being performed when the identified parking duration exceeds the second minimum parking duration, wherein the third upper charge state limit value is lower than the second upper charge state limit value.

10. A motor vehicle, comprising:
an electric motor for driving the motor vehicle,
a battery for storing and providing electric power for operating the electric motor, and
a control apparatus for controlling at least one electrical consumer of the motor vehicle that is electrically coupled to the battery,
wherein the motor vehicle is configured to carry out the method according to claim 1.

\* \* \* \* \*